United States Patent [19]

Coulombeau

[11] 4,261,801

[45] Apr. 14, 1981

[54] PROCESS FOR ASSEMBLING A POROUS MEMBRANE ON A SUPPORT AND ASSEMBLY PRODUCED IN THIS MANNER

[75] Inventor: Alain Coulombeau, Le Cendre, France

[73] Assignee: Compagnie Generale des Etablissements Michelin, Clermont-Ferrand, France

[21] Appl. No.: 94,779

[22] Filed: Nov. 16, 1979

Related U.S. Application Data

[62] Division of Ser. No. 897,565, Apr. 18, 1978, Pat. No. 4,211,829.

[30] Foreign Application Priority Data

Apr. 27, 1977 [FR] France ............................. 77 13470
Mar. 31, 1978 [FR] France ............................. 78 10010

[51] Int. Cl.³ ...................... C25D 5/02; C25D 5/54
[52] U.S. Cl. .......................................... 204/16; 204/20
[58] Field of Search ..................... 204/20, 24, 26, 30, 204/2.1, 16

[56] References Cited

U.S. PATENT DOCUMENTS

| 1,547,408 | 7/1925 | Buisson | 204/21 |
| 2,737,541 | 3/1956 | Coolidge | 204/20 |
| 3,407,125 | 10/1968 | Fehlner | 204/20 |
| 3,483,111 | 12/1969 | Zaromb | 429/27 |
| 3,598,656 | 8/1971 | Trachtenberg | 429/44 |
| 3,759,800 | 9/1973 | Reinke | 204/16 |
| 3,840,407 | 10/1974 | Yao et al. | 429/27 |
| 3,932,197 | 1/1976 | Katz et al. | 429/44 |
| 4,053,371 | 10/1977 | Towsley | 204/26 |

FOREIGN PATENT DOCUMENTS

| 1952915 | 4/1971 | Fed. Rep. of Germany | 204/16 |
| 864753 | 4/1961 | United Kingdom . | |
| 1232116 | 5/1971 | United Kingdom . | |

*Primary Examiner*—T. M. Tufariello
*Attorney, Agent, or Firm*—Brumbaugh, Graves, Donohue & Raymond

[57] ABSTRACT

Process for the assembling at least one support, at least part of the surface of which conducts electrons, with at least one electrically insulating membrane, said membrane having pores at least part of which are open pores, is improved by causing an electrolytic depositing of at least one metal in a part of the open pores, said electrolytic deposit adhering to at least a part of the electron-conductive surface of the support.

12 Claims, 6 Drawing Figures

PROCESS FOR ASSEMBLING A POROUS MEMBRANE ON A SUPPORT AND ASSEMBLY PRODUCED IN THIS MANNER

This is a division, of application Ser. No. 897,565, filed Apr. 18, 1978, (now U.S. Pat. No. 4,211,829).

This invention relates to processes for the assembling of at least one support to at least one membrane.

Such a process can be applied, for instance, in the event that the assembled support and membrane are used in a chemical and/or electrochemical device. This is the case in particular when the support, at least a portion of the surface of which conducts electrons, is intended to release electrons or to collect electrons in a compartment of an electrochemical device, the support being then ordinarily known as an "electron collector." It goes without saying that these applications are not limitative, and the assembled support and membrane can be used in devices other than chemical and/or electrochemical devices, for instance in filters.

The assembling of the support to the membrane is generally effected by means of an adhesive, which adhesive may, for example, be thermoplastic, thermosetting or an elastomer.

When it is desired to effect such an assembling to a porous membrane without doing away with the porosity of the membrane, this process permits only imperfect adherence between the contacting surfaces of the support and the membrane. A partial or complete dissociation of the assembly is in fact noted. In addition to the poor mechanical strength of the assembly due to this dissociation, additional drawbacks are noted.

Thus, for instance, in chemical and/or electrochemical devices employing the assembly, there may be an accumulation of bubbles of gas in the spaces formed as a result of this dissociation between the support and the membrane, resulting in defective operation of the part of the device located in the vicinity of said bubbles, which part may in particular be an electrode. Furthermore, if the device employing the assembly contains a fluid, and particularly a liquid, in which particles are contained, the fluid and the particles being in movement, particles may penetrate into the spaces due to the dissociation when the support is perforated, the dimensions of the openings of the support being greater than the average diameter of the particles, which causes a heterogeneity in the flow of the fluid and the particles, which heterogeneity is harmful to the operation of the device and may lead to the clogging of the device.

French Pat. No. 821,466 described an electrode for an electric storage battery formed of active material in electric contact with a conductive light support which can be attacked by the electrolyte. In order to avoid attack of this support by the electrolyte and decrease the weight of the electrode, a material which is nonattackable by the electrolyte, for example, an insulating material which is traversed by channels, is arranged between the support and the active material. All the channels of the nonattackable material are filled with a metal by electrolysis so as to assure the impermeability of the electrode, that is to say the absence of contact between the electrolyte and the support, as well as the electrical connection between the support and the active material.

The process described in said patent eliminates the porosity of the insulating material, whereas such porosity is necessary in order to permit the migration of a fluid, for example, an electrolyte, through the assembly, if such migration is desired.

The object of the invention is to avoid these drawbacks.

Accordingly, the process of the invention for assembling at least one support, at least part of the surface of which conducts electrons, with at least one electrically insulating membrane, said membrane having pores at least part of which are open pores, is characterized by causing an electrolytic depositing of at least one metal in a part of the open pores, said electrolytic deposit adhering to at least a part of the electron-conductive surface of the support, the assembled membrane being porous due to the presence of open pores without deposit.

The invention also applies to assemblies produced in accordance with this process and to devices employing these assemblies.

The figures of the drawing, which are all diagrammatic, together with their description as well as the examples which follow are intended to illustrate the invention and facilitate an understanding thereof without, however, limiting its scope.

Figure 1:
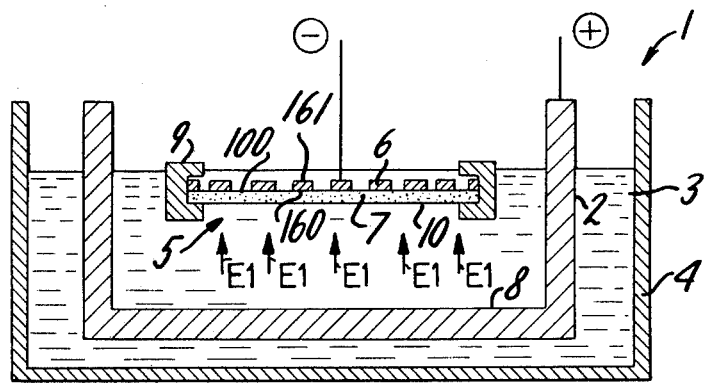
FIG. 1 shows, in cross section, a device which makes it possible to carry out the process of the invention.

FIG. 1 shows an electrolytic device 1 which permits the carrying out of the process of the invention. The device 1 comprises a metal anode 2 dipping into an electrolyte 3 contained in a tank 4. The assembly 5 is also immersed in the electrolyte 3, this assembly 5 being formed of a support 6 acting as cathode and of a membrane 7. By way of example, the anode 2 has the shape of a cup whose bottom 8 is flat and horizontal; the assembly 5 is arranged in this cup 2; the membrane 7 has a general orientation parallel to the bottom 8; the support 6 has the shape of a grid made, for instance, of a fabric or an expanded metal, said grid 6 being arranged above the membrane 7; the assembly 5, whose general shape is flat, is attached at its edges in a frame 9 which is electrically insulating and impermeable to the electrolyte.

The electrically insulating membrane 7 comprises pores at least a part of which are open pores. This membrane 7 may be, for instance, prepared separately, in particular in the form of a film, and applied by compression to the support 6. The membrane 7 may, on the other hand, be prepared directly on the support 6, for instance from a solution of at least one organic polymer in a solvent or in a mixture of solvents, said solution being in particular sprayed under pressure to form fibers which are deposited directly onto the support 6, in accordance with French application No. 75/38242 published as No. 2,335,062. The membrane 7 thus obtained by dispersion forms what is generally known as a "non-woven", which may be possibly subjected to compression, in contact with the support 6, after evaporation of the solvent by drying.

The electrolyte 3 contains, in solution, a salt of the metal which it is desired to deposit by electrolysis in order to effect the assembling of the support 6 and the membrane 7.

The operating conditions—which are in no way limitative—may for instance be the following:
support 6 and anode 2: made of nickel;
membrane 7: of polyvinylchloride;
aqueous electrolyte 8: of a pH of 5 to 6 containing about 40 g/L of Ni++ ions (the nickel being introduced, for example, into the electrolyte in the form of nickel chloride) and 40 g/L of ammonium chloride;
electrolysis current between the anode 2 and the cathode 6 at a temperature of about 25° C.: current density 40 mA/cm$^2$ of the face 10 of the membrane 7, said face 10 being directed towards the bottom 8 of the anode 2; quantity of current 40 mAh per cm$^2$ of the face 10; use of pulsating direct current, the ratio Tp/Tn being approximately equal to 50%, Tp being the time of passage of the current and Tn the time during which the current does not pass, and the frequency being approximately equal to 1 cycle per second.

It is noted that at the end of the electrolytic depositing the adherence between the support 6 and the membrane 7 constituting the final assembly 5 is considerably improved as compared with the initial adherence of these components in the initial assembly 5. The explanation is probably the following.

Figure 2:
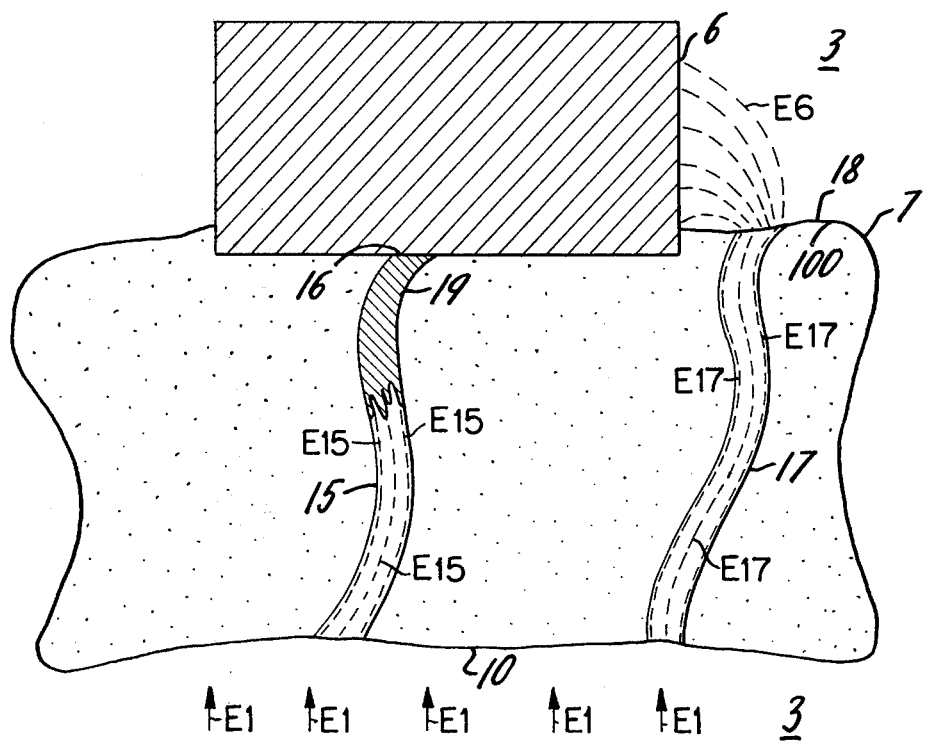
FIG. 2 shows, in cross section, a portion of an assembly made by the process in accordance with the invention.

FIG. 2 represents a portion of the assembly 5. In this FIg. 2, two open pores of the membrane 7 are shown—the open pore 15 extending from the face 10 of the membrane 7 and terminating on the portion 16 of the surface of the support 6 in contact with the membrane 7, and the open pore 17 extending from the face 10 and terminating on the portion 18 of the face 100 of the membrane 7 opposite the face 10, this portion 18 being in contact with the electrolyte 3. As a result of the presence of the membrane 7 and of the insulating frame 9 the lines of the electric field, symbolized by the arrows E1, must pass through the membrane 7 in order to arrive at the support 6 from the anode 2.

Since the membrane 7 is a nonconductor of electrons, the electric field follows the open pores, this electric field being indicated by the dashed lines E15 and E17 located in the open pores 15 and 17, respectively (FIG. 2). The electric field lines E15 terminate at the surface portion 16 of the support 6, permitting a deposit of nickel on this portion 16. During the electrolysis, this deposit grows gradually into the open pore 15 in the direction towards the face 10 opposite the support 6.

One thus obtains a filamentary deposit 19 in at least a part of the open pores which are similar to the pore 15 which connects the face 10 of the membrane 7 to the support 6, these open pores being capable of communicating with each other. These filamentary deposits 19, possibly branched due to communications between the open pores, permit an anchoring of the support 6 onto the membrane 7 and therefore a good mechanical strength of the assembly 5. This anchoring is particularly effective when the open pores 15 have a zigzag structure and/or when the deposits 19 are branched.

Figure 3:
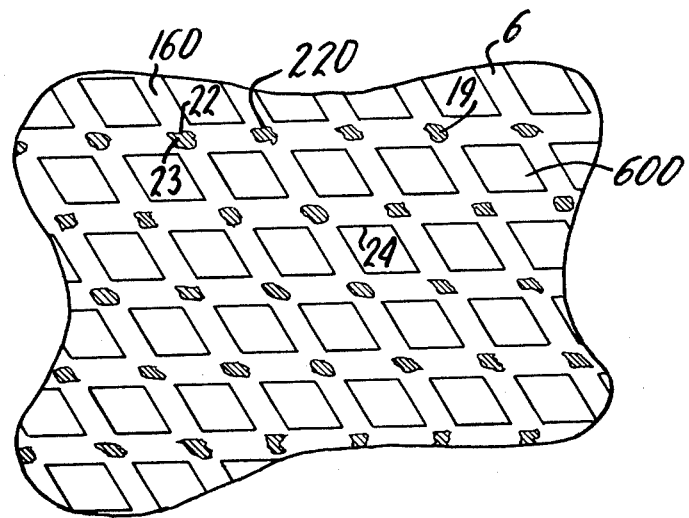
FIG. 3 shows, in plan view, a portion of an assembly made in accordance with the process of the invention, the membrane having been torn off from the assembly.

On the other hand, the electric field lines E17 which arrive at the portion 18 which is in contact with the electrolyte 3 diverge in the electrolyte 3, producing a fan of field lines E6 (shown in dashed lines in FIG. 2) leading to a large zone (not provided with reference number) of the surface of the support 6 in contact with the electrolyte 3, thus causing a practically uniform thin deposit of nickel on this zone. FIG. 3 shows a portion of the support 6 after electrolysis and removal of the membrane 7 initially assembled to the support 6 in accordance with the invention, this membrane 7 having been prepared separately and applied to the support 6 before the electrolysis. One then notes the presence of arborescent deposits 22 on the side on which the membrane 7 was located, at the nodal points 23 of the grid 6 which is formed of a fabric or an expanded metal, these arborescent deposits 22 being formed by the combination of filamentary deposits 19. On the other hand, the branches 24 of the grid 6 are without such arborescent deposit. This is due to the fact that during the electrolysis the nodal points 23 were in contact with the membrane 7 while the branches 24 were in loose contact, or not in contact at all, with the membrane 7, the number of nodal points 23 being capable of being sufficient, however, to assure a good mechanical strength of the assembly 5. It is therefore important that the support 6 have sufficient zones of contact with the membrane 7 during the electrolysis; hence the advisability of applying the membrane 7 to the support 6 by compression when the membrane 7 is prepared separately. When the membrane 7 is prepared directly on the support 6, in particular in accordance with the process described in the above-mentioned published French application, good contact is obtained between the support 6 and the membrane 7, so that in general compression is not necessary. The pressure used for the compression, if effected, may vary within very wide limits, for instance from 1 kg/cm$^2$ to several tens of kilograms/cm$^2$, this pressure being capable of being applied before or even advantageously during the electrolysis.

If one desires that the face 10 remain insulating, one can regulate as desired the growth of the deposits 19 in such a manner that they do not pass through the membrane 7.

It should be noted, on the other hand, that one can, if desired, close all or part of the open pores 15 and 17 of the membrane 7 after the deposits 19 have been effected. This closing can be effected, for instance, by filling these pores with a material or by compressing the face 10 of the membrane 7, this face 10 being preferably then brought to a temperature which permits the melting or softening of the material constituting said face 10.

The structure of the device 1 makes it possible to obtain electric field lines E1 which are practically parallel between the anode 2 and the cathode 6. This parallel orientation of the electric field lines is preferable, since it makes it possible to have a practically homogeneous distribution of the field lines on the face 10 of the membrane 7 and therefore an optimal distribution of the deposits 19.

The anchoring between the filamentary deposit 19 and the support 6 is in general effected under the best conditions when the metal of this deposit 19 is identical to the metal forming the support 6, but this operating condition is not necessary; one can as a matter of fact use different metals for the deposit 19 and the support 6. The metal used to produce the deposit 19 is then selected preferably as a function of the nature of the support 6 in order to avoid the fomration of galvanic couples upon the use of the assembly 5.

In addition to nickel, the metals which make it possible to produce the deposit 19 can be numerous, for instance copper, iron, silver, gold and platinum. It goes without saying, furthermore, that one can deposit several metals during the same electrolysis operation and that the support 6 can be made with a metal alloy which possibly contains the same metal as the metal of the deposit, or even with any other nonmetallic substance which conducts electrons, for example, carbides or nitrides. Furthermore, it is not necessary that the entire mass of the support 6 conduct the electrons; one may use supports 6 formed of a material which does not conduct electrons, for example, a glass, ceramic, or a macromolecular material, this material being covered, in whole or in part, by a material which does conduct electrons, and the deposit 19 being then effected on this conductive material.

The best anchorings between the membrane 7 and the support 6 are obtained by effecting the electrolysis with a pulsating current, as described in the example. This is probably due to the fact that, when the membrane is thick or when its open pores are fine, the use of a nonpulsating direct current causes a depletion of ions of the metal deposited in the open pores, which favors the accumulating in these pores of products coming from the parasitic electrolysis reaction of the solvent. The formation of the deposit 19 is then disturbed thereby.

In the example described, the support 6 is in the form of a grid, but it is obvious that any other form of support could be used, for example, a perforated sheet or a sheet without openings.

It is clear, furthermore, that the support 6 and the membrane 7 do not need to have a flat general shape. Other shapes could be contemplated, for example, a tubular shape, the anode 2 then preferably also having a tubular shape, as in the device 30 shown in FIG. 4. In this device 30, the anode 32 has the shape of a cylinder of revolution of axis XX′, this XX′ axis being, for example, vertical. Within the cylinder 32 there is arranged the assembly 35, formed of the support 36 and membrane 37 in contact with each other, said support 36 and membrane 37 having the shape of cylinders of revolution with axis XX′. The membrane 37 is arranged between the anode 32 and the electron-conducting support 36 serving as cathode. The assembly 35 and the anode 32 are immersed in an electrolyte (not shown) contained within a tank (not shown). The upper and lower edges of the assembly 35 are preferably fixed in insulating frames (not shown) in a manner similar to the frame 9 in FIG. 1, so that the electric field lines which are indicated by the arrows E4 between the anode 32 and the membrane 37 are practically radial, that is to say oriented towards the axis XX′ and perpendicular to said axis. The field lines then distribute themselves homogeneously over the surface 38 of the membrane 37, said surface 38 being opposite the support 36.

After electrolysis one thus obtains an assembly 35 having cylinders 36 and 37 fastened to each other by the deposits 19 previously described, the support cyliner 36 being located in the interior of the assembly 35. This assembly 35 can be used as is. It can also, for example, be deformed or unwound after having been cut, so as to obtain a flat assembly similar to the assembly 5. It goes without saying that by arranging the support 36 and the membrane 37 on the outside of the anode 32, the membrane 37 being arranged between the anode 32 and the support 36, these parts being again cylinders of revolution having the same axis, one then obtains an assembly formed of the cylinders 36 and 37 and the deposits 19, the support 36 being located on the outside of the membrane 37.

It is clear that one can contemplate the use of more than one anode in the electrolysis devices for the carrying out of the process of the invention or that one can produce simultaneously several assemblies in accordance with the invention in one and the same device. It goes without saying, furthermore, that the assemblies in accordance with the invention may also each have several supports and/or several membranes.

Figure 5:
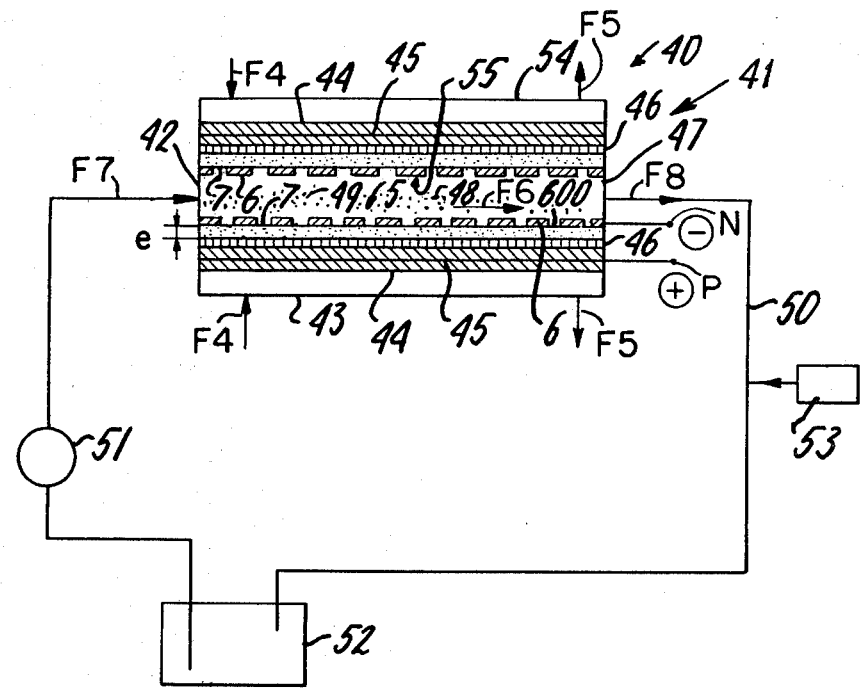
FIGS. 5 and 6 both show, in cross section, an electrochemical current generator employing at least one assembly in accordance with the invention.

FIG. 5 shows a device 40 which employs at least one assembly 5, shown in FIG. 1. This device 40 is an electrochemical generator of electric current having a cell 41. This cell 41 has an anode compartment 42 and a cathode compartment 43. This cathode compartment 43 has a cathode 44 of generally practically flat shape which is, for example, an air or oxygen diffusion electrode, the introduction and departure of gas into and from the cathode compartment 43 being indicated by the arrows F4 and F5, respectively.

The cathode collector 45 which is intended to deliver into the cathode 44 the electrons necessary for the reduction of the oxygen, a cathodic active material, is connected to the positive terminal P of the generator.

The cell 41 uses an assembly identical to the assembly 5, established in such a manner that the membrane 7 is arranged against the cathode 44, this assembled membrane being porous due to the presence of open pores without deposit 19. The support 6, in grid shape, of the assembly 5, is arranged on the side opposite the cathode 44 with respect to the membrane 7. This grid 6 serves as anode collector and is connected to the negative terminal N of the generator 40. The deposits 19 of the assembly 5 are such that they do not entirely pass through the membrane 7, so as to avoid any short circuit with the electron-conductive parts of the cathode 44, these deposits 19, for example, passing through between 10% and 90%, and preferably about 50%, of the thickness "e" of the membrane 7, said thickness "e" being greater preferably than 50 microns and ranging, for example, from 0.1 to 1.5 mm.

The main characteristics of the assembly 5 are, for instance, the following:

(a) membrane 7: "PVC" membrane of the AMERACE Company, this hydrophilic open-pore membrane being formed essentially of polyvinylchloride and silica; thickness about 0.6 mm, average pore diameter less than 5 microns, for example, of the order of 0.1 micron;

(b) grid 6 made from an expanded metal sheet, in particular a copper sheet, having about sixty nodal points 23 per $cm^2$; each main face 160, 161 of the grid 6 (FIGS. 1 and 3) has about 20% to 50%, for example, about 30%, free surface, corresponding to the opening 600 of the grid 6 (FIGS. 3 and 5); 50% to 80% of each face 160, 161, corresponding therefore to a metallic surface;

(c) the membrane 7 is applied to the grid 6 in such a manner that the main faces 160 of the grid 6 and 100 of the membrane 7 are in contact with each other during the electrolysis; the deposits 19 are made of copper; after electrolysis, about 20% to 50%, for example, about 30%, of the metal surface of the face 160 of the grid 6 in contact with the membrane 7 is covered with arborescent deposits 22, these deposits covering only the portions 220 of the surface of the nodal points 23 of the grid 6 on the face 160 of the grid 6 in contact with the membrane 7 (FIG. 3), the branches 24 of the grid 6 being without such deposits; the fraction of surface of the grid 6 covered by the deposits 22 therefore corresponds to the portions 220 which are determined macroscopically, that is to say they encompass both the effective sections of the deposit 19 and the surface of the support 6 located between the deposits 19 which are in the vicinity of each other; assuming that the distribution of the open pores 15, 17 on the face 100 of the membrane 7 is practically homogeneous, these percentages correspond practically to the percentages of open pores 15 opening on the support 6 which have deposits 19, only a limited number of such open pores 15 having deposits 19; the electrolytic deposit therefore covers at most only about 40% of the facing faces 160 and 100 of the support 6 and the membrane 7, since the portions of the face 100 of the membrane 7 opposite the openings 600 do not have any deposit 19; this distribution of the arborescent deposits 22 is obtained probably due to a so-called "point" effect during the electrolysis, this effect causing a preferential deposit on the protuberances of the expanded metal 6 located essentially in the nodal points 23;

(d) absorption of aqueous 8N potassium hydroxide solution (8 mols of potassium hydroxide per liter) in the membrane 7, the measurements being effected at room temperature, namely about 20° C., after impregnation for 24 hours: the ratio $$R = \frac{P_1 - P_o}{P_o} \times 100$$

is equal to about 170 before the production of the assembly 5, and to about 160 after the production of said assembly, $P_1$ and $P_o$ representing, respectively, the weight of the membrane 7 after and before absorption of the potassium hydroxide solution; this ratio, which therefore varies little upon the production of the assembly 5, gives a faithful picture of the permeability of the membrane 7 to this solution, this permeability being obtained by means of open pores 15, 17 which are free of deposit 19;

(e) electrical measurements carried out on the membrane 7: the transverse resistance per unit of surface of said membrane is practically the same before and after the making of the assembly 5, namely about 0.16Ω cm², this measurement being effected by ionic conduction with a pulsating current in an aqueous 8 N potassium hydroxide solution at about 20° C. after impregnation for 24 hours; this resistance, for a thickness of the membrane 7 equal to 0.6 mm, corresponds to a specific resistivity of about 2.66Ω cm, while the 8 N aqueous potassium hydroxide solutiion has a specific resistivity of about 1.80Ω cm at 20° C.

The cathode 44 may possibly comprise a porous membrane 46 in contact with the membrane 7 of the assembly 5, so as further to reduce the risks of short-circuits between the anode collector 6 and the cathode 44, which membrane 46 may, for example, be prepared directly on the body of the cathode 44, in accordance with the above-mentioned published French application, from a solution of at least one organic polymer in a solvent or mixture of solvents. The contact between the membrane 7 and the electrode 44, with or without membrane 46, can be effected by compression or by means of a binder.

The anode compartment 42 is filled with an electrolyte 47, for example, an alkaline electrolyte, and particularly aqueous potassium hydroxide, for example, a 4 to 12 N potassium hydroxide solution containing 4 to 12 mols of potassium hydroxide per liter.

This electrolyte 47 contains particles 48 formed, at least in part, of an anodic active metal, these particles 48 being, for example, zinc particles which oxidize in the anode compartment 42, losing electrons which are collected by the anode collector 6. In accordance with U.S. Pat. No. 4,092,461, the particles 48 may, for example, form a sedimentation bed 49 contiguous to the anode collector 6, which is then arranged at the lower part of the inside of the anode compartment 42.

The movements of the particles 48 in this bed 49, entrained by the electrolyte in the average direction indicated diagrammatically by the arrow F6, in this case favor the diffusion of the reaction products into the electrolyte.

The feed device indicated diagrammatically by the arrow F7 makes it possible to introduce the electrolyte 47 and the particles 48 into the anode compartment 42. This feed device F7 can, for example, be one of the feed devices described in U.S. Pat. No. 4,101,717, these devices making it possible to cause the divergence of the current lines of the flow. The evacuation device indicated diagrammatically by the arrow F8 makes it possible to evacuate from the anode compartment 42 the electrolyte 47 and the particles 48 which have not been entirely consumed during their passage through the compartment, this device F8 being, for example, one of the evacuation devices described in the above-mentioned U.S. Pat. No. 4,101,717, these devices making it possible to cause a convergence of the current lines of the flow. The evacuation device F8 is connected to the feed device F7 by a path 50 outside the cell 41, this path comprising the pump 51 which permits the circulation of the electrolyte 47 and the particles 48 in the anode compartment 42, in the path 50, and in the devices F7 and F8, and the buffer tank 52 for the electrolyte 47 and particles 48. The device 53 which terminates in the path 50 makes it possible to maintain the percentage by weight of particles 48 in the electrolyte 47 constant, if so desired. The porous membrane 7 which is impermeable to the particles 48, and the porous membrane 46, if it is used, have a hydrophilic character, which facilitates the diffusion of the electrolyte 47 through these membranes and therefore the ionic exchanges, through the openings 600 of the grid 6, between the electrolyte 47 and the cathode 44 whose body is formed, for example, essentially, as known, of nickel, activated charcoal, silver and a fluorinated polymer.

The concentration of zinc dissolved in the electrolyte is maintained below a limit beyond which the particles 48 would be made passive, such limit being for instance on the order of 120 g/L of electrolyte when the electrolyte 47 is 6 N potassium hydroxide (6 mols of potassium hydroxide per liter).

During the operation of the generator 40, no separation is noted between the grid 6 and the membrane 7 and therefore no accumulation of gas bubbles, as well as no accumulation of particles 48 between the grid 6 and the membrane 7 when the average diameter of the particles 48 is less than the dimensions of the openings 600 of the grid 6.

This result is surprising, since only a small part of the face 100 of the membrane 7 is connected to the face 160 of the grid 6 by arborescent deposits 22. The generator 40 can therefore operate continuously, without passivation of the particles 48 and without obstruction of the anode compartment 42, the cathode 44 operating practically homogeneously due to the good permeability to electrolyte 47 of the membrane 7 in the assembly 5.

It should be noted that other embodiments of the assembly 5 can be contemplated, for example, an embodiment such that the arborescent deposits 22 cover practically the entire surface of the grid 6 in contact with the membrane 7.

The cell 41 may possibly have a symmetrical structure. It then has another cathode compartment 54, for example, identical to the cathode compartment 43 and arranged parallel to said compartment 43 and above it, the reference numbers F4, F5, 44, 45, 46 relating to the cathode compartment 54 having the same meaning as in the case of cathode compartment 43. Another assembly 55, which is identical, for example, to the assembly 5, is then arranged in such a manner that its membrane 7 is located against the cathode 44 of the cathode compartment 54, possibly via the membrane 46 of said compartment 54, the grid 6 of this assembly 55 being arranged on the side opposite said cathode 44 with respect to said membrane 7, said grid 6 thus acting as upper anode collector.

The electrolyte 47 and the particles 48 then flow between the two anode grids 6. This arrangement makes it possible practically to double the power of the cell 41, the other operating conditions remaining the same.

Figure 4:
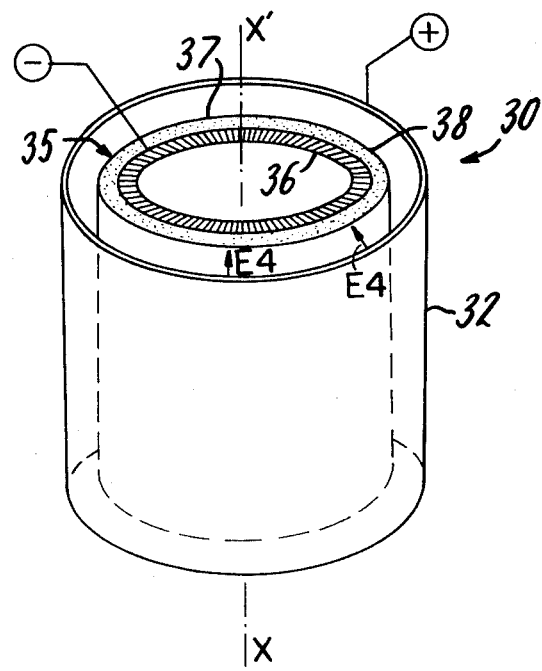
FIG. 4 shows, in perspective, another device which permits the carrying out of the process of the invention.
Figure 6:
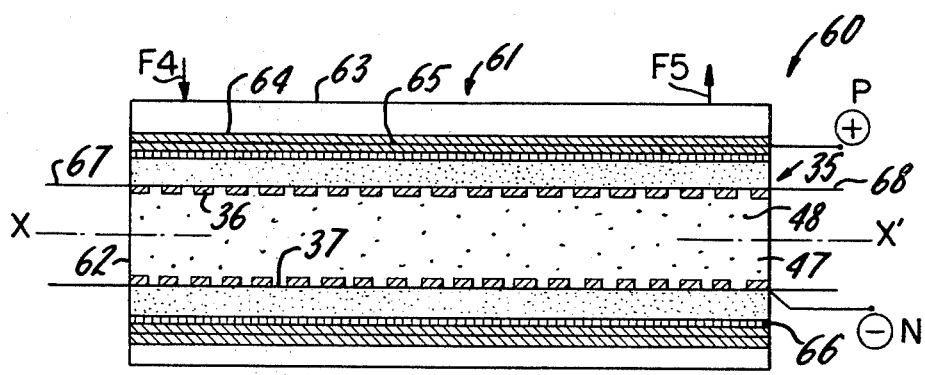

FIG. 6 shows an electrochemical generator 60 similar to the generator 40 but using the cylindrical assembly 35 shown in FIG. 4. This generator 60 has a cell 61 of generally cylindrical shape in the center of which the assembly 35 is located.

The interior of the assembly 35 constitutes the anode compartment 62 in which the electrolyte 47 and the particles 48 flow, the support 36 having the shape of a grid conducting the electrons, arranged on the side of the electrolyte 47 and particles 48. A tubular cathode 64, having the same axis XX' as the assembly 35, this axis XX' being located in the plane of FIG. 6, is applied to the outside of the assembly 35 and around the porous membrane 37, said cathode 64 possibly having a porous membrane 66 in contact with the membrane 37. The entrance and departure of gas into and from the cathode compartment 63 in which there is located the cathode 64 together with its collector 65, connected to the positive terminal P of the cell 61, are indicated diagrammatically by the arrows F4 and F5, respectively. The conduit 67 makes it possible to introduce the electrolyte 47 containing the particles 48 into the anode compartment 62, the conduit 68 serving to evacuate the electrolyte 47 and the particles 48 which have not been entirely consumed during their passage through the anode compartment 62. The flow of the electrolyte 47 and of the particles 48 in the compartment 62 takes place in turbulent manner, so that the particles 48 undergo repeated contacts with the entire surface of the tubular grid 36, which acts as anode collector connected to the negative terminal N of the cell 61.

The generators 40 and 60 previously described contain only one cell, but one can imagine electrochemical generators having a plurality of cells, each using at least one assembly in accordance with the invention.

It goes without saying that in the electrochemical generators 40 and 60 which were previously described one may employ cathodes whose active material is not gaseous, for example, cathodes having at least one oxygen compound, and particularly a metallic oxide. It also goes without saying that these generators may possibly function even if the membranes 7 and 37 are not applied against the corresponding cathodes 44 and 64, these membranes being possibly separated then from the respective cathodes by an electrolyte.

Of course, the invention is not limited to the embodiments described above. On the basis thereof, one may contemplate other methods and embodiments without thereby going beyond the scope of the invention.

What is claimed is:

1. Process for assembling at least one support, at least part of the surface of which conducts electrons, with at least one electrically insulating membrane, said membrane having pores at least part of which are open pores, the assembling being performed by causing an electrolytic depositing of at least one metal in a part of the open pores, said electrolytic deposit adhering to at least a part of the electron-conductive surface of the support, the assembled membrane being porous due to the presence of open pores without deposit, characterized by the following features:
    (a) the depositing is effected in pores having a zigzag structure and an average pore diameter which is substantially smaller than the thickness of the membrane so that the deposit is filamentary and/or branched;
    (b) the growth of the deposit is regulated in such a manner that the deposit does not pass through the membrane and that the face of the membrane opposite the support remains insulating;
    (c) the assembling is effected in such a manner that the assembled support and membrane are capable of being used in an electrochemical device.

2. Process according to claim 1, characterized by the fact that during the electrolytic depositing the support serves as cathode, at least one anode being used for the electrolytic depositing, and by the fact that the lines of the electric field which connect the anode and the cathode pass through the membrane.

3. Process according to claim 2, characterized by the fact that the lines of the electric field coming from the anode distribute themselves practically homogeneously over the surface of the membrane.

4. Process according to claim 1 or 2, characterized by the fact that the membrane is applied by compression onto the support before or during the electrolytic depositing.

5. Process according to claim 1 or 2, characterized by the fact that the membrane is prepared from a solution of at least one organic polymer in a solvent or in a mixture of solvents, said solution being sprayed under pressure to form fibers which are deposited directly onto the support.

6. Process according to claim 1 or 2, characterized by the fact that the electrolytic depositing is carried out with a pulsating direct current.

7. Process according to claim 6, characterized by the fact that the ratio Tp/Tn is approximately equal to 50%, Tp being the time of passage of the current and Tn the time during which the current does not pass, the frequency being approximately equal to 1 cycle per second.

8. Process according to claim 1 or 2, characterized by the fact that the surface of the support which conducts electrons is formed of a metal or an alloy.

9. Process according to claim 8, characterized by the fact that the metal of the electrolytic deposit is the same as the metal constituting the surface of the support or as a metal of the alloy constituting said surface.

10. Process according to claim 1 or 2, characterized by the fact that the electrolytic deposit covers only a part of the surface of the support in contact with the membrane.

11. Process according to claim 1 or 2, characterized by the fact that the support is perforated.

12. Process according to claim 11, characterized by the fact that the main face of the support in contact with the membrane has about 20% to 50% free surface.

* * * * *